United States Patent
Tanaka et al.

(10) Patent No.: US 9,340,688 B2
(45) Date of Patent: May 17, 2016

(54) THERMAL INKJET RECORDING METHOD

(71) Applicant: KAO CORPORATION, Tokyo (JP)

(72) Inventors: Satoshi Tanaka, Wakayama (JP); Teruyuki Fukuda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/779,047

(22) PCT Filed: Apr. 7, 2014

(86) PCT No.: PCT/JP2014/060131
§ 371 (c)(1),
(2) Date: Sep. 22, 2015

(87) PCT Pub. No.: WO2014/168126
PCT Pub. Date: Oct. 16, 2014

(65) Prior Publication Data
US 2016/0053123 A1    Feb. 25, 2016

(30) Foreign Application Priority Data

Apr. 11, 2013  (JP) ................................. 2013-083305

(51) Int. Cl.
| | | |
|---|---|---|
| B41J 2/05 | (2006.01) | |
| C09D 11/30 | (2014.01) | |
| B41J 2/01 | (2006.01) | |
| C09D 133/08 | (2006.01) | |
| B41J 2/21 | (2006.01) | |

(52) U.S. Cl.
CPC . C09D 11/30 (2013.01); B41J 2/01 (2013.01); B41J 2/2107 (2013.01); C09D 133/08 (2013.01)

(58) Field of Classification Search
CPC ...... B41J 2/211; B41J 2/1433; B41J 2/17593; B41J 2/2107; B41J 2/1755; B41J 2/2114; B41J 2/2117; B41J 2/2056; B41J 2/0057; B41J 3/60; C09D 11/36; C09D 11/40; C09D 11/03; C09D 11/30; C09D 11/38; C09D 11/322; C09D 11/328; C09D 11/101; C09D 11/005; C09D 11/54; C09D 11/52
See application file for complete search history.

(56) References Cited

U.S. PATENT DOCUMENTS

| | | |
|---|---|---|
| 4,723,129 A | 2/1988 | Endo et al. |
| 4,740,796 A | 4/1988 | Endo et al. |
| 5,879,439 A * | 3/1999 | Nagai .................... C09D 11/32 106/31.28 |
| 2007/0263054 A1 | 11/2007 | Yatake et al. |
| 2010/0227948 A1 | 9/2010 | Nagase et al. |

FOREIGN PATENT DOCUMENTS

| | | |
|---|---|---|
| JP | 61-059911 B2 | 12/1986 |
| JP | 2004-107453 A | 4/2004 |
| JP | 2005-220296 A | 8/2005 |
| JP | 2006-274018 A | 10/2006 |
| JP | 2010-138297 A | 6/2010 |
| JP | 2010-189625 A | 9/2010 |
| JP | 2010-189626 A | 9/2010 |
| JP | 2012-140611 A | 7/2012 |

OTHER PUBLICATIONS

International Search Report issued in PCT/JP2014/060131, mailed on Jul. 1, 2014.

* cited by examiner

*Primary Examiner* — Juanita D Jackson
(74) *Attorney, Agent, or Firm* — Birch, Stewart, Kolasch & Birch, LLP

(57) ABSTRACT

The present invention relates to a thermal ink-jet printing method including the step of ejecting a water-based ink including pigment-containing polymer particles from a print head by an action of a thermal energy, in which the polymer constituting the polymer particles includes not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles; [2] a water dispersion for thermal ink-jet printing used in the above method; [3] a water-based ink for thermal ink-jet printing including the above water dispersion; and [4] a use of the above ink in a thermal ink-jet printing method.

20 Claims, No Drawings

THERMAL INKJET RECORDING METHOD

FIELD OF THE INVENTION

The present invention relates to a thermal ink-jet printing method, a water dispersion for thermal ink-jet printing which is used in the thermal ink-jet printing method, a water-based ink for thermal ink-jet printing which contains the water dispersion, and a use of the ink in a thermal ink-jet printing method.

BACKGROUND OF THE INVENTION

In ink-jet printing methods, droplets of ink are directly projected onto a recording medium from very fine nozzles and allowed to adhere to the recording medium, to form images or characters. The ink-jet printing methods have been rapidly spread because of their various advantages such as easiness of full coloration, low costs, capability of using a plain paper as the recording medium, non-contact with printed images or characters, etc.

In recent years, as an ink for ink-jet printing, there have mainly been used pigment-based inks prepared by dispersing a pigment, a polymer, etc., in water, from the viewpoints of good water resistance and weather resistance thereof.

As a method of ejecting an ink in the ink-jet printing methods, there are known a piezoelectric method utilizing a mechanical energy and a thermal method utilizing a thermal energy.

The ink containing a polymer tends to suffer from ejection defects of ink droplets owing to increase in viscosity of the ink in ejection nozzles when an interval between the ink droplets ejected is increased during inkjet recording. To avoid occurrence of the defects, it is preferable to adopt the thermal ink-jet printing method having a higher ink ejection force of the ink droplets than that of the piezoelectric ink-jet printing method.

On the other hand, in the thermal ink-jet printing method, since a thermal energy is applied to an ink, there tends to occur such a phenomenon that contaminants such as soot are deposited onto a heater portion of a thermal print head, i.e., so-called "kogation" (deposition of residues on a surface of a resistive element).

For example, in JP 2010-138297A, it is described that in a recent thermal ink-jet printing method, there is such a tendency that a temperature of a surface of a resistive element used therein tends to be elevated for improving a quality of ink images produced, and therefore the kogation in the thermal ink-jet printing method tends to pose significant problems because it tends to induce deterioration in thermal efficiency and ejection efficiency of an ink, as well as deterioration in quality of ink images owing to ejection defects of ink droplets and decrease in ejection speed thereof.

JP 2010-138297A discloses a process for producing a water dispersion for thermal ink-jet printing which is excellent in ejection property, in which an anionic group of a polymer containing a constitutional unit derived from a methacrylic acid ester is excessively neutralized using a volatile base upon a dispersing treatment of particles of the polymer, etc., to enhance an ejection property of an ink in a thermal print head, and the volatile base is removed after the dispersing treatment, to maintain a good durability of the thermal print head.

In addition, JP 2004-107453A discloses an ink set suitable for thermal ink-jet printing which is excellent in color balance, etc., and capable of obtaining high-quality ink images.

The ink set includes at least two kinds of ink compositions containing a pigment dispersed with an anionic substance, and a reaction solution capable of reacting with the ink compositions to coagulate the ink compositions, and the pigment contained in the ink is kept substantially identical in particle size before and after the reaction.

SUMMARY OF THE INVENTION

The present invention relates to the following aspects [1] to [4].

[1] A thermal ink-jet printing method including the step of ejecting a water-based ink including pigment-containing polymer particles from a print head by an action of a thermal energy, in which the polymer constituting the polymer particles includes not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles.

[2] A water dispersion for thermal ink-jet printing including pigment-containing polymer particles, the polymer constituting the polymer particles including not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles.

[3] A water-based ink for thermal ink-jet printing including the water dispersion according to the above aspect [2].

[4] A use of the ink according to the above aspect [3] in a thermal ink-jet printing method.

DETAILED DESCRIPTION OF THE INVENTION

It has been however found that even the water dispersion for thermal ink-jet printing which is produced by the method described in JP 2010-138297A tends to sometimes suffer from occurrence of the kogation. Also, the ink set described in JP 2004-107453A is still unsatisfactory in properties thereof.

The present invention relates to a thermal ink-jet printing method that is capable of suppressing occurrence of kogation to a sufficient extent, a water dispersion for thermal ink-jet printing used in the above method, a water-based ink for thermal ink-jet printing including the water dispersion, and a use of the above ink in a thermal ink-jet printing method.

The present inventors have found that by using a polymer including a constitutional unit derived from an acrylic acid ester containing a hydrocarbon group having a specific number of carbon atoms and a constitutional unit derived from acrylic acid as constitutional units of the polymer constituting the pigment-containing polymer particles, it is possible to suppress occurrence of kogation in a heater portion of a thermal print head.

That is, the present invention relates to the following aspects [1] to [4].

[1] A thermal ink-jet printing method including the step of ejecting a water-based ink including pigment-containing polymer particles from a print head by an action of a thermal energy, in which the polymer constituting the polymer particles includes not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles.

[2] A water dispersion for thermal ink-jet printing including pigment-containing polymer particles, the polymer constituting the polymer particles including not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles.

[3] A water-based ink for thermal ink-jet printing including the water dispersion according to the above aspect [2].

[4] A use of the ink according to the above aspect [3] in a thermal ink-jet printing method.

According to the present invention, there are provided a thermal ink-jet printing method that is capable of suppressing occurrence of kogation to a sufficient extent, a water dispersion for thermal ink-jet printing used in the above method, a water-based ink for thermal ink-jet printing including the water dispersion, and a use of the above ink in a thermal ink-jet printing method.

[Thermal Ink-Jet Printing Method]

The thermal ink-jet printing method of the present invention includes the step of ejecting a water-based ink including pigment-containing polymer particles from a print head by an action of a thermal energy, in which the polymer constituting the polymer particles includes not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles.

The mechanism of suppressing occurrence of the kogation by the present invention is considered as follows, though it is not clearly determined.

In general, when using an ink containing polymer particles in a thermal ink-jet printing method, it is considered that the polymer particles tend to be deposited on a surface of a resistive element in a heater of a thermal print head, i.e., kogation tends to occur thereon. In this case, a surface portion of the resistive element which comes into contact with the ink is charged negatively, and a carboxy group of the acrylic acid which is contained as a hydrophilic group in the polymer particles used in the present invention has a negative charge. For this reason, it is considered that there occurs a static repulsion force between the polymer particles and the surface of the resistive element, so that deposition of the polymer particles on the surface of the resistive element can be suppressed.

On the other hand, in order to enclose the pigment in the polymer, it is necessary that the polymer has a hydrophobic group. The monomers as constitutional units of the polymer used in the present invention have a high copolymerizability, and the polymer includes the above constitutional unit derived from the acrylic acid ester and the above constitutional unit derived from acrylic acid at the specific ratios, so that hydrophilic groups and hydrophobic groups are contained in the polymer at specific proportions.

For this reason, both of a function of enclosing the pigment in the polymer and a function of suppressing deposition of the pigment-containing (enclosing) polymer particles on a surface of the resistive element can be appropriately satisfied. As a result, it is considered that occurrence of kogation can be effectively suppressed.

In the thermal ink-jet printing method, an ink is ejected by a thermal method. In the thermal method, the ink onto which a thermal energy is applied undergoes a rapid change in volume thereof which exerts an acting force on the ink to eject the ink from nozzles. For example, a basic principle of the preferred thermal method is disclosed in U.S. Pat. No. 4,723,129A and U.S. Pat. No. 4,740,796A. More specifically, as the thermal method, there may be mentioned those methods described in JP 61-59911B, etc.

The recording medium used in the thermal ink-jet printing method of the present invention is not particularly limited, and is preferably a paper medium or a film, and more preferably a paper medium. Examples of the paper medium include a plain paper, a form paper, a coated paper and a photographic paper.

(Ejecting Conditions of Ink)

The preferred ejecting conditions of the ink in the thermal ink-jet printing method according to the present invention are as follows.

The temperature of a surface of a resistive element of a heater is preferably not lower than 150° C., more preferably not lower than 200° C., and still more preferably not lower than 250° C., and is also preferably not higher than 800° C., more preferably not higher than 700° C., and still more preferably not higher than 600° C., from the viewpoints of attaining a high efficiency of the thermal ink-jet printing method and remarkably exhibiting the effects of the present invention.

The voltage applied in the thermal ink-jet printing method is preferably not less than 1 V, more preferably not less than 3 V, and still more preferably not less than 5 V, and is also preferably not more than 25 V, more preferably not more than 20 V, and still more preferably not more than 18 V, from the viewpoints of attaining a high efficiency of the thermal ink-jet printing method and remarkably exhibiting the effects of the present invention.

The drive frequency used in the thermal ink-jet printing method is preferably not less than 0.1 kHz, more preferably not less than 1 kHz, and still more preferably not less than 3 kHz, and is also preferably not more than 20 kHz, more preferably not more than 15 kHz, and still more preferably not more than 10 kHz, from the viewpoint of suppressing occurrence of kogation.

The pulse width used in the thermal ink-jet printing method is preferably not less than 0.01 μs, more preferably not less than 0.1 μs, and still more preferably not less than 0.3 μs, and is also preferably not more than 3.0 μs, more preferably not more than 2.0 μs, and still more preferably not more than 1.5 μs, from the viewpoint of suppressing occurrence of kogation.

The amount of the ink ejected in the form of droplets is controlled such that an amount of one droplet of the ink ejected is preferably not less than 0.5 pL, more preferably not less than 1.0 pL, still more preferably not less than 1.5 pL, and even still more preferably not less than 3.0 pL, from the viewpoints of avoiding adverse influence of a gas flow and maintaining an accuracy of a landing position of the ink droplets. In the case of printing small characters, from the viewpoints of avoiding collapse of characters owing to thickening of the characters and improving a quality of the resulting images, the amount of the ink ejected is controlled such that an amount of one droplet of the ink ejected is preferably not more than 30 pL, more preferably not more than 10 pL, and still more preferably not more than 5.0 pL.

The average ejection speed of the ink droplets is preferably not less than 6 m/s, more preferably not less than 8 m/s, and still more preferably not less than 10 m/s, and is also preferably not more than 20 m/s, more preferably not more than 18 m/s, and still more preferably not more than 15 m/s.

Meanwhile, the average ejection speed of the ink droplets may be calculated by the method described in Examples below.

In the following, the respective components used in the water dispersion for thermal ink-jet printing, the water dispersion and the water-based ink are described.

The water dispersion for thermal ink-jet printing used in the present invention includes pigment-containing polymer particles.

<Pigment>

The pigment used in the present invention may be either organic or inorganic. The organic or inorganic pigment may be used in combination with an extender pigment, if required.

Examples of the inorganic pigments include carbon blacks, metal oxides, metal sulfides and metal chlorides. Of these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames of C.I. Pigment Yellow, C.I. Pigment Red, C.I. Pigment Violet, C.I. Pigment Blue and C.I. Pigment Green with various product numbers. Examples of the extender pigment include silica, calcium carbonate and talc.

As the pigment, there may be used a so-called self-dispersible pigment. The "self-dispersible pigment" as used herein means a pigment onto a surface of which one or more anionic hydrophilic groups or cationic hydrophilic groups are bonded either directly or through the other atom group to thereby render the pigment dispersible in an aqueous medium without using a surfactant or a resin. In this case, in particular, the anionic hydrophilic group is preferably a carboxy group ($-COOM^1$) and a sulfonic group ($-SO_3M^1$) wherein $M^1$ is a hydrogen atom, an alkali metal or ammonium, and the cationic hydrophilic group is preferably a quaternary ammonium group.

The above pigments may be used alone or in the form of a mixture of any two or more thereof.

<Pigment-Containing Polymer Particles>
(Polymer Constituting Polymer Particles)

The polymer used in the present invention includes not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer.

The content of the constitutional unit derived from the acrylic acid ester in the polymer is preferably not less than 79% by mass, and more preferably not less than 80% by mass, and is also preferably not more than 87% by mass, and more preferably not more than 86% by mass, on the basis of a total mass of whole constitutional units in the polymer.

The content of the constitutional unit derived from acrylic acid in the polymer is preferably not more than 21% by mass, and more preferably not more than 20% by mass, and is also preferably not less than 13% by mass, and more preferably not less than 14% by mass, on the basis of a total mass of whole constitutional units in the polymer.

Examples of the hydrocarbon group having not less than 3 and not more than 8 carbon atoms as a substituent group of the acrylic acid ester include an alkyl group and an aromatic group.

The number of carbon atoms of the alkyl group is preferably not less than 4, and is also preferably not more than 6, and more preferably not more than 5, from the viewpoint of suppressing occurrence of kogation.

Specific examples of the alkyl group-containing acrylic acid ester include (iso)propyl acrylate, butyl acrylate, (iso- or tert-)butyl acrylate, (iso)amyl acrylate, cyclohexyl acrylate, 2-ethylhexyl acrylate and (iso)octyl acrylate. Of these compounds, preferred is butyl acrylate.

Meanwhile, the term "(iso)" as used herein means both the structure in which the group expressed by "iso" is present, and the structure in which the group is not present (i.e., normal).

The number of carbon atoms of the aromatic group is preferably not less than 6, and is also preferably not more than 7, from the viewpoint of suppressing occurrence of kogation.

Specific examples of the aromatic hydrocarbon group-containing acrylic acid ester include benzyl acrylate and phenoxyethyl acrylate. Of these compounds, preferred is benzyl acrylate.

The polymer used in the present invention may also include other constitutional units, in addition to the constitutional unit derived from the acrylic acid ester and the constitutional unit derived from acrylic acid, unless the inclusion of the other constitutional units adversely affects the effects of the present invention. However, it is preferred that the polymer is constituted substantially of the constitutional unit derived from the acrylic acid ester and the constitutional unit derived from acrylic acid only, and includes no other constitutional units. More specifically, the total content of the constitutional unit derived from the acrylic acid ester and the constitutional unit derived from acrylic acid in the polymer is preferably not less than 95% by mass, more preferably not less than 98% by mass, and still more preferably 100% by mass, on the basis of a total mass of whole constitutional units in the polymer.

[Production of Polymer]

The polymer used in the present invention may be produced by copolymerizing a monomer mixture constituted substantially of an acrylic acid ester containing a hydrocarbon group having not less than 3 and not more than 8 carbon atoms, and acrylic acid by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably an organic polar solvent. The organic polar solvent that is miscible with water may be used in the form of a mixture with water. Examples of the organic polar solvents include aliphatic alcohols having 1 to 3 carbon atoms such as methanol, ethanol and propanol; ketones such as acetone, methyl ethyl ketone and methyl isobutyl ketone; and esters such as ethyl acetate. Among these solvents, preferred are methanol, ethanol, acetone, methyl ethyl ketone, methyl isobutyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used in the polymerization is preferably not less than 0.001 mol, more preferably not less than 0.002 mol, and still more preferably not less than 0.004 mol per 1 mol of the monomer mixture, and is also preferably not more than 2 mol, more preferably not more than 1 mol, still more preferably not more than 0.1 mol, even still more preferably not more than 0.05 mol, and further even still more preferably not more than 0.01 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture may vary depending upon the kinds of radical polymerization initiator, monomers, solvent, etc., to be used, and therefore are not particularly limited. The temperature usually used in the polymerization is preferably not lower than 30° C., more preferably not lower than 40° C., and still more preferably not lower than 50° C., and is also preferably not higher than 100° C., more preferably not higher than 80° C., and still more preferably not higher than 70° C. The polymerization time is preferably not less than 30 min, more preferably not less than 1 h, and still more preferably not less than 2 h, and is also preferably not more than 20 h, more preferably not more than 15 h, and still more preferably not more than 10 h. Thus, the polymerization time is preferably from 1 to 20 h, and more preferably from 2 to 10 h.

The polymerization is preferably conducted in an atmosphere of an inert gas such as a nitrogen gas and argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

(Weight-Average Molecular Weight of Polymer)

The weight-average molecular weight of the polymer is preferably not less than 5,000, more preferably not less than 10,000, still more preferably not less than 20,000, even still more preferably not less than 30,000, and further even still more preferably not less than 50,000, and is also preferably not more than 400,000, more preferably not more than 300,000, still more preferably not more than 200,000, even still more preferably not more than 100,000, and further even still more preferably not more than 90,000, from the viewpoints of a good optical density and a good gloss of the resultant printed images and a good dispersion stability of the pigment. Meanwhile, the weight-average molecular weight of the polymer may be measured by the method described in Examples below.

(Neutralization of Polymer)

The polymer used is preferably neutralized with a neutralizing agent. When neutralizing the polymer with the neutralizing agent, the degree of neutralization is not particularly limited. However, the neutralization treatment is preferably carried out such that the finally obtained water dispersion usually exhibits a pH of not less than 4.5 and not more than 10. The pH of the water dispersion may be determined from the desired neutralization degree of the polymer.

As the neutralizing agent, there may be used bases such as lithium hydroxide, sodium hydroxide, potassium hydroxide, ammonia, methylamine, dimethylamine, trimethylamine, ethylamine, diethylamine, triethylamine, triethanolamine and tributylamine. Of these bases, preferred is at least one base selected from the group consisting of sodium hydroxide and ammonia.

The degree of neutralization of the salt-forming group contained in the polymer is preferably not less than 210%, more preferably not less than 230%, and still more preferably not less than 250%, and is also preferably not more than 500%, more preferably not more than 450%, and still more preferably not more than 400%.

The degree of neutralization is calculated according to the following formula:

$$\{[\text{mass (g) of neutralizing agent/equivalent of neutralizing agent}]/[\text{acid value of polymer (KOHmg/g)} \times \text{mass (g) of polymer}/(56 \times 1000)]\} \times 100.$$

The acid value may be calculated from the respective constitutional units of the polymer, or may also be determined by the method of subjecting a solution prepared by dissolving the polymer in an appropriate solvent (such as, for example, methyl ethyl ketone) to titration.

(Production of Water Dispersion of Pigment-Containing Polymer Particles)

In the present invention, the polymer particles are used in the form of pigment-containing polymer particles in order to stably disperse the pigment. The process for producing the water dispersion of the pigment-containing polymer particles is not particularly limited, and can be efficiently carried out by such a production process including the following steps (I) to (III).

Step (I): obtaining a mixture containing a polymer, an organic solvent, a pigment and water, if required, together with a neutralizing agent;

Step (II): subjecting the mixture obtained in the step (I) to dispersing treatment to obtain a dispersion of pigment-containing polymer particles; and Step (III): removing the organic solvent from the dispersion obtained in the step (II) to obtain a water dispersion of the pigment-containing polymer particles.

In the step (I), the polymer is first dissolved in the organic solvent, and then the pigment and water are added, if required, together with optional components such as a neutralizing agent and a surfactant, to the thus obtained organic solvent solution and mixed therewith to obtain a dispersion of an oil-in-water type. The content of the pigment in the resulting mixture is preferably not less than 5% by mass, more preferably not less than 10% by mass, and still more preferably not less than 12% by mass, and is also preferably not more than 50% by mass, more preferably not more than 40% by mass, and still more preferably not more than 20% by mass.

The content of the organic solvent in the mixture is preferably not less than 5% by mass, more preferably not less than 10% by mass, and still more preferably not less than 15% by mass, and is also preferably not more than 70% by mass, more preferably not more than 50% by mass, and still more preferably not more than 30% by mass.

The content of the polymer in the mixture is preferably not less than 1% by mass, more preferably not less than 2% by mass, and still more preferably not less than 3% by mass, and is also preferably not more than 40% by mass, more preferably not more than 20% by mass, and still more preferably not more than 10% by mass.

The content of water in the mixture is preferably not less than 10% by mass, more preferably not less than 20% by mass, and still more preferably not less than 40% by mass, and is also preferably not more than 75% by mass, more preferably not more than 70% by mass, and still more preferably not more than 65% by mass.

As described above, the polymer used is preferably neutralized with the neutralizing agent. In addition, the polymer may be previously neutralized.

Examples of the organic solvent include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. The solubility of the organic solvent in 100 g of water as measured at 20° C. is preferably not less than 5 g, more preferably not less than 10 g, and still more preferably not less than 15 g, and is also preferably not more than 50 g, more preferably not more than 35 g, and still more preferably not more than 30 g. Of these organic solvents, preferred are methyl ethyl ketone and methyl isobutyl ketone. Also, the solubility of the organic solvent in 100 g of water as measured at 20° C. is preferably from 5 to 80 g and more preferably from 10 to 50 g.

The method for dispersing the mixture in the step (II) is not particularly limited. The polymer particles may be atomized into fine particles having a desired average particle size only by a substantial dispersion procedure. However, it is preferred that the mixture is first subjected to a preliminary dispersion procedure, and then to the substantial dispersion procedure by applying a shear stress thereto so as to control the average particle size of the obtained polymer particles to a desired value.

The dispersing temperature used in the step (II) is preferably not lower than 5° C., more preferably not lower than 7° C., and still more preferably not lower than 10° C., and is also preferably not higher than 50° C., more preferably not higher than 35° C., and still more preferably not higher than 25° C.

When subjecting the mixture to the preliminary dispersion procedure, there may be used ordinary mixing and stirring devices such as anchor blades. Examples of the preferred mixing and stirring devices include high-speed stirring mixers such as "Ultra Disper" (tradename) available from Asada Iron Works Co., Ltd., "Ebara Milder" (tradename) available from Ebara Corporation, and "TK Homomixer" (tradename) available from Primix Corporation.

As a means for applying a shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename) available from Izumi Food Machinery Co., Ltd., and "Mini-Lab 8.3H Model" (tradename) available from Rannie Corporation, and chamber-type high-pressure homogenizers such as "Microfluidizer" (tradename) available from Microfluidics Corporation, and "Nanomizer" (tradename) available from Nanomizer Inc. These apparatuses may be used in combination of any two or more thereof. Of these apparatuses, the high-pressure homogenizers are preferred in view of reducing a particle size of the pigment.

In addition, the dispersion procedure may be carried out using an ultrasonic homogenizer. For example, the ultrasonic homogenizer has an drive frequency of not less than 20 kHz and not more than 2,000 kHz. Also, the wattage per one liter of a whole reaction solution of the ultrasonic homogenizer is preferably not less than 20 W, more preferably not less than 35 W, and still more preferably not less than 50 W, and is also preferably not more than 1,000 W, more preferably not more than 900 W, and still more preferably not more than 800 W. In addition, the wattage per one liter of a whole reaction solution of the ultrasonic homogenizer is preferably from 20 to 1,000 W, and more preferably from 50 to 800 W. The ultrasonic disperser is commercially available from Nippon Seiki Co., Ltd., Alex Corporation, etc. These apparatuses may be used in combination of any two or more thereof.

In the step (III), the organic solvent is removed by distillation from the dispersion thus obtained in the step (II) by known methods to render the dispersion aqueous, thereby obtaining a water dispersion of the pigment-containing polymer particles. The organic solvent is substantially completely removed from the thus obtained water dispersion of the pigment-containing polymer particles. The content of the organic solvent in the resulting water dispersion is preferably not more than 0.5% by mass, more preferably not more than 0.1% by mass, and still more preferably not more than 0.01% by mass.

In the water dispersion thus obtained in the step (III), as described above, the pigment-containing polymer particles are dispersed in a solvent containing water as a main medium.

The average particle size of the pigment-containing polymer particles in the resulting water dispersion is preferably not less than 50 nm, more preferably not less than 70 nm, and still more preferably not less than 90 nm, and is also preferably not more than 200 nm, more preferably not more than 170 nm, still more preferably not more than 150 nm, and even still more preferably not more than 120 nm, from the viewpoints of a good dispersion stability and a good ejection property of the resulting ink.

Meanwhile, the average particle size of the pigment-containing polymer particles may be measured by the method described in Examples below.

[Water Dispersion for Thermal Ink-Jet Printing]

The contents of the respective components in the water dispersion for thermal ink-jet printing according to the present invention are as follows.

The content of the pigment in the water dispersion of the present invention is preferably not less than 3% by mass, more preferably not less than 6% by mass, still more preferably not less than 9% by mass, and even still more preferably not less than 12% by mass, and is also preferably not more than 50% by mass, more preferably not more than 40% by mass, still more preferably not more than 30% by mass, and even still more preferably not more than 20% by mass, from the viewpoint of enhancing an optical density of the resulting ink.

The mass ratio of the pigment to the polymer [pigment/polymer] in the water dispersion of the present invention is preferably not less than 1.0, more preferably not less than 1.5, and still more preferably not less than 1.7, and is also preferably not more than 9.0, more preferably not more than 6.0, still more preferably not more than 5.0, even still more preferably not more than 4.0, and further even still more preferably not more than 2.5, from the viewpoint of a good dispersion stability thereof.

In addition, the ratio of a molar amount of a carboxy group of the polymer to a mass of the pigment [—COOH (mmol)/pigment (g)] in the water dispersion of the present invention is preferably not less than 0.65 mmol/g, more preferably not less than 0.70 mmol/g, and still more preferably not less than 0.80 mmol/g, and is also preferably not more than 1.40 mmol/g, more preferably not more than 1.30 mmol/g, and still more preferably not more than 1.25 mmol/g, from the viewpoint of enhancing an ejection speed of the resulting ink.

The content of water in the water dispersion of the present invention is preferably not less than 30% by mass, more preferably not less than 40% by mass, still more preferably not less than 55% by mass, and even still more preferably not less than 70% by mass, and is also preferably not more than 90% by mass, more preferably not more than 85% by mass, and still more preferably not more than 80% by mass.

The surface tension of the water dispersion of the present invention (as measured at 20° C.) is preferably not less than 30 mN/m, more preferably not less than 33 mN/m, and still more preferably not less than 35 mN/m, and is also preferably not more than 65 mN/m, more preferably not more than 63 mN/m, and still more preferably not more than 60 mN/m.

The viscosity of the water dispersion of the present invention having a solid content of 20% by mass (as measured at 20° C.) is preferably not less than 1.5 mPa·s, more preferably not less than 2 mPa·s, and still more preferably not less than 3 mPa·s, and is also preferably not more than 7 mPa·s, more preferably not more than 6 mPa·s, and still more preferably not more than 5 mPa·s, from the viewpoint of obtaining a water-based ink having a suitable viscosity.

Meanwhile, the viscosity of the water dispersion may be measured by the method described in Examples below.

The water dispersion of the present invention may be directly used as a water-based ink. However, if required, the water dispersion of the present invention may be further compounded with various ordinary additives such as a wetting agent, a penetrant, a dispersant, a viscosity controller, a defoaming agent, a mildew-proof agent and a rust preventive.

The average particle size of the pigment-containing polymer particles in the resulting water dispersion is preferably not less than 50 nm, more preferably not less than 70 nm, and still more preferably not less than 90 nm, and is also preferably not more than 200 nm, more preferably not more than 170 nm, still more preferably not more than 150 nm, and even still more preferably not more than 120 nm, from the viewpoint of preventing clogging of nozzles in a printer and attaining a good dispersion stability of the water dispersion.

Meanwhile, the average particle size of the pigment-containing polymer particles may be measured by the method described in Examples below.

[Water-Based Ink for Thermal Ink-Jet Printing]

The water-based ink for thermal ink-jet printing according to the present invention includes the water dispersion for thermal ink-jet printing according to the present invention.

The contents of the respective components in the water-based ink of the present invention are as follows.

The content of the pigment in the water-based ink of the present invention is preferably not less than 1% by mass, more preferably not less than 2% by mass, still more preferably not less than 3% by mass, and even still more preferably not less than 4% by mass, and is also preferably not more than 25% by mass, more preferably not more than 20% by mass, still more preferably not more than 15% by mass, and even still more preferably not more than 12% by mass, from the viewpoint of enhancing an optical density of the resulting ink.

The mass ratio of the pigment to the polymer [pigment/polymer] in the water-based ink of the present invention is the same as that of the above water dispersion, i.e., is preferably not less than 1.0, more preferably not less than 1.5, and still more preferably not less than 1.7, and is also preferably not more than 9.0, more preferably not more than 6.0, still more preferably not more than 5.0, even still more preferably not more than 4.0, and further even still more preferably not more than 1.25.

In addition, the ratio of a molar amount of a carboxy group of the polymer to a mass of the pigment [—COOH (mmol)/pigment (g)] in the water-based ink of the present invention is the same as that of the above water dispersion, i.e., is preferably not less than 0.65 mmol/g, more preferably not less than 0.70 mmol/g, and still more preferably not less than 0.80 mmol/g, and is also preferably not more than 1.40 mmol/g, more preferably not more than 1.30 mmol/g, and still more preferably not more than 1.25 mmol/g, from the viewpoint of enhancing an ejection speed of the resulting ink.

The content of water in the water-based ink of the present invention is preferably not less than 30% by mass, more preferably not less than 40% by mass, still more preferably not less than 55% by mass, and even still more preferably not less than 70% by mass, and is also preferably not more than 90% by mass, more preferably not more than 85% by mass, and still more preferably not more than 80% by mass.

The surface tension of the water-based ink of the present invention (as measured at 25° C.) is preferably not less than 20 mN/m, more preferably not less than 23 mN/m, and still more preferably not less than 25 mN/m, and is also preferably not more than 45 mN/m, more preferably not more than 43 mN/m, and still more preferably not more than 40 mN/m, from the viewpoint of ensuring a good ejection property of the ink from nozzles.

The viscosity of the water-based ink of the present invention (as measured at 20° C.) is preferably not less than 2.0 mPa·s, more preferably not less than 2.3 mPa·s, and still more preferably not less than 2.5 mPa·s, and is also preferably not more than 12 mPa·s, more preferably not more than 11 mPa·s, and still more preferably not more than 10 mPa·s, from the viewpoint of ensuring a good ejection property of the ink.

The water-based ink of the present invention may be further compounded with various ordinary additives usually used for water-based inks, if required. Examples of the additives include a wetting agent, a penetrant, a dispersant such as a surfactant, a viscosity controller such as hydroxypropyl cellulose, hydroxyethyl cellulose and polyvinyl alcohol, a defoaming agent such as silicone oils, a mildew-proof agent and a rust preventive.

Specific examples of the wetting agent and the penetrant include polyhydric alcohols as well as ethers, acetates and the like thereof, such as ethylene glycol, propylene glycol, diethylene glycol, triethylene glycol, polyethylene glycol, glycerol, trimethylol propane and diethylene glycol diethyl ether. Of these compounds, preferred are glycerol and trimethylol propane.

Specific examples of the surfactant include nonionic surfactants such as ethyleneoxide adducts of acetylene glycol, etc.

The average particle size of the pigment-containing polymer particles in the resulting water-based ink is preferably not less than 50 nm, more preferably not less than 70 nm, and still more preferably not less than 90 nm, and is also preferably not more than 200 nm, more preferably not more than 170 nm, still more preferably not more than 150 nm, and even still more preferably not more than 120 nm, from the viewpoint of preventing clogging of nozzles in a printer and attaining a good dispersion stability of the water-based ink.

Meanwhile, the average particle size of the pigment-containing polymer particles may be measured by the method described in Examples below.

With respect to the aforementioned embodiments, the present invention further provides the following aspects relating to the thermal ink-jet printing method and the like.

<1> A thermal ink-jet printing method including the step of ejecting a water-based ink including pigment-containing polymer particles from a print head by an action of a thermal energy, in which the polymer constituting the polymer particles includes not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles.

<2> The thermal ink-jet printing method according to the above aspect <1>, wherein the hydrocarbon group of the acrylic acid ester containing the hydrocarbon group is at least one group selected from the group consisting of an alkyl group having not less than 4 and not more than 6 carbon atoms and preferably not less than 4 and not more than 5 carbon atoms, and an aromatic group having not less than 6 and not more than 7 carbon atoms.

<3> The thermal ink-jet printing method according to the above aspect <1>, wherein the acrylic acid ester containing the hydrocarbon group is at least one compound selected from the group consisting of butyl acrylate and benzyl acrylate.

<4> The thermal ink-jet printing method according to any one of the above aspects <1> to <3>, wherein a weight-average molecular weight of the polymer is preferably not less than 5,000, more preferably not less than 10,000, still more preferably not less than 20,000, even still more preferably not less than 30,000, and further even still more preferably not less than 50,000, and is also preferably not more than 400,000, more preferably not more than 300,000, still more preferably not more than 200,000, even still more preferably not more than 100,000, and further even still more preferably not more than 90,000.

<5> The thermal ink-jet printing method according to any one of the above aspects <1> to <4>, wherein an average particle size of the pigment-containing polymer particles is preferably not less than 50 nm, more preferably not less than 70 nm, and still more preferably not less than 90 nm, and is also preferably not more than 200 nm, more preferably not more than 170 nm, still more preferably not more than 150 nm, and even still more preferably not more than 120 nm.

<6> The thermal ink-jet printing method according to any one of the above aspects <1> to <5>, wherein a content of the constitutional unit derived from the acrylic acid ester in the polymer is preferably not less than 79% by mass, and more preferably not less than 80% by mass, and is also preferably not more than 87% by mass, and more preferably not more than 86% by mass, and a content of the constitutional unit derived from acrylic acid in the polymer is preferably not more than 21% by mass, and more preferably not more than 20% by mass, and is also preferably not less than 13% by mass, and more preferably not less than 14% by mass.

<7> The thermal ink-jet printing method according to any one of the above aspects <1> to <6>, wherein a content of the pigment in the water-based ink is preferably not less than 1% by mass, more preferably not less than 2% by mass, still more preferably not less than 3% by mass, and even still more preferably not less than 4% by mass, and is also preferably not more than 25% by mass, more preferably not more than 20% by mass, still more preferably not more than 15% by mass, and even still more preferably not more than 12% by mass.

<8> The thermal ink-jet printing method according to any one of the above aspects <1> to <7>, wherein a mass ratio of the pigment to the polymer [pigment/polymer] in the water-based ink is preferably not less than 1.0, more preferably not less than 1.5, and still more preferably not less than 1.7, and is also preferably not more than 9.0, more preferably not more than 6.0, still more preferably not more than 5.0, even still more preferably not more than 4.0, and further even still more preferably not more than 2.5.

<9> The thermal ink-jet printing method according to any one of the above aspects <1> to <8>, wherein a ratio of a molar amount of a carboxy group of the polymer to a mass of the pigment [—COOH (mmol)/pigment (g)] in the water-based ink is preferably not less than 0.65 mmol/g, more preferably not less than 0.70 mmol/g, and still more preferably not less than 0.80 mmol/g, and is also preferably not more than 1.40 mmol/g, more preferably not more than 1.30 mmol/g, and still more preferably not more than 1.25 mmol/g.

<10> The thermal ink-jet printing method according to any one of the above aspects <1> to <9>, wherein a temperature of a surface of a resistive element of a heater is preferably not lower than 150° C., more preferably not lower than 200° C., and still more preferably not lower than 250° C., and is also preferably not higher than 800° C., more preferably not higher than 700° C., and still more preferably not higher than 600° C.

<11> The thermal ink-jet printing method according to any one of the above aspects <1> to <10>, wherein a drive frequency used for the heater is preferably not less than 0.1 kHz, more preferably not less than 1 kHz, and still more preferably not less than 3 kHz, and is also preferably not more than 20 kHz, more preferably not more than 15 kHz, and still more preferably not more than 10 kHz.

<12> The thermal ink-jet printing method according to any one of the above aspects <1> to <11>, wherein a pulse width used for the heater is preferably not less than 0.01 µs, more preferably not less than 0.1 µs, and still more preferably not less than 0.3 µs, and is also preferably not more than 3.0 µs, more preferably not more than 2.0 µs, and still more preferably not more than 1.5 µs.

<13> The thermal ink-jet printing method according to any one of the above aspects <1> to <12>, wherein an amount of the ink ejected is controlled such that an amount of one droplet of the ink ejected is preferably not less than 0.5 pL, more preferably not less than 1.0 pL, still more preferably not less than 1.5 pL, and even still more preferably not less than 3 pL, and is also preferably not more than 30 pL, more preferably not more than 10 pL, and still more preferably not more than 5.0 pL.

<14> The thermal ink-jet printing method according to any one of the above aspects <1> to <13>, wherein an average ejection speed of the ink droplets is preferably not less than 6 m/s, more preferably not less than 8 m/s, and still more preferably not less than 10 m/s, and is also preferably not more than 20 m/s, more preferably not more than 18 m/s, and still more preferably not more than 15 m/s.

<15> A water dispersion for thermal ink-jet printing including pigment-containing polymer particles, the polymer constituting the polymer particles including not less than 78% by mass and not more than 88% by mass of a constitutional unit derived from an acrylic acid ester containing a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles.

<16> The water dispersion for thermal ink-jet printing according to the above aspect <15>, wherein the hydrocarbon group of the acrylic acid ester containing the hydrocarbon group is at least one group selected from the group consisting of an alkyl group having not less than 4 and not more than 6 carbon atoms and preferably not less than 4 and not more than 5 carbon atoms, and an aromatic group having not less than 6 and not more than 7 carbon atoms.

<17> The water dispersion for thermal ink-jet printing according to the above aspect <15>, wherein the acrylic acid ester containing the hydrocarbon group is at least one compound selected from the group consisting of butyl acrylate and benzyl acrylate.

<18> The water dispersion for thermal ink-jet printing according to any one of the above aspects <15> to <17>, wherein a weight-average molecular weight of the polymer is preferably not less than 5,000, more preferably not less than 10,000, still more preferably not less than 20,000, even still more preferably not less than 30,000, and further even still more preferably not less than 50,000, and is also preferably not more than 400,000, more preferably not more than 300,000, still more preferably not more than 200,000, even still more preferably not more than 100,000, and further even still more preferably not more than 90,000.

<19> The water dispersion for thermal ink-jet printing according to any one of the above aspects <15> to <18>, wherein an average particle size of the pigment-containing polymer particles is preferably not less than 50 nm, more preferably not less than 70 nm, and still more preferably not less than 90 nm, and is also preferably not more than 200 nm, more preferably not more than 170 nm, still more preferably not more than 150 nm, and even still more preferably not more than 120 nm.

<20> The water dispersion for thermal ink-jet printing according to any one of the above aspects <15> to <19>, wherein a content of the constitutional unit derived from the acrylic acid ester in the polymer is preferably not less than 79% by mass, and more preferably not less than 80% by mass, and is also preferably not more than 87% by mass, and more preferably not more than 86% by mass, and a content of the constitutional unit derived from acrylic acid in the polymer is preferably not more than 21% by mass, and more preferably not more than 20% by mass, and is also preferably not less than 13% by mass, and more preferably not less than 14% by mass.

<21> The water dispersion for thermal ink-jet printing according to any one of the above aspects <15> to <20>, wherein a content of the pigment in the water dispersion is preferably not less than 3% by mass, more preferably not less than 6% by mass, still more preferably not less than 9% by mass, and even still more preferably not less than 12% by mass, and is also preferably not more than 50% by mass, more preferably not more than 40% by mass, still more preferably not more than 30% by mass, and even still more preferably not more than 20% by mass.

<22> The water dispersion for thermal ink-jet printing according to any one of the above aspects <15> to <21>, wherein a mass ratio of the pigment to the polymer [pigment/polymer] in the water dispersion is preferably not less than 1.0, more preferably not less than 1.5, and still more preferably not less than 1.7, and is also preferably not more than 9.0, more preferably not more than 6.0, still more preferably not more than 5.0, even still more preferably not more than 4.0, and further even still more preferably not more than 2.5.

<23> The water dispersion for thermal ink-jet printing according to any one of the above aspects <15> to <22>, wherein a ratio of a molar amount of a carboxy group of the polymer to a mass of the pigment [—COOH (mmol)/pigment (g)] in the water dispersion is preferably not less than 0.65 mmol/g, more preferably not less than 0.70 mmol/g, and still more preferably not less than 0.80 mmol/g, and is also preferably not more than 1.40 mmol/g, more preferably not more than 1.30 mmol/g, and still more preferably not more than 1.25 mmol/g.

<24> A water-based ink for thermal ink-jet printing including the water dispersion according to any one of the above aspects <15> to <23>.

<25> The water-based ink for thermal ink-jet printing according to the above aspect <24>, wherein a content of the pigment in the water-based ink is preferably not less than 1% by mass, more preferably not less than 2% by mass, still more preferably not less than 3% by mass, and even still more preferably not less than 4% by mass, and is also preferably not more than 25% by mass, more preferably not more than 20% by mass, still more preferably not more than 15% by mass, and even still more preferably not more than 12% by mass.

<26> The water-based ink for thermal ink-jet printing according to the above aspect <24> or <25>, wherein a mass ratio of the pigment to the polymer [pigment/polymer] in the water-based ink is preferably not less than 1.0, more preferably not less than 1.5, and still more preferably not less than 1.7, and is also preferably not more than 9.0, more preferably not more than 6.0, still more preferably not more than 5.0, even still more preferably not more than 4.0, and further even still more preferably not more than 1.25.

<27> A use of the water-based ink for thermal ink-jet printing according to any one of the above aspects <24> to <26> in a thermal ink-jet printing method.

EXAMPLES

In the following Production Example, Preparation Examples, Examples and Comparative Examples, the "part (s)" and "%" indicate "part(s) by mass" and "% by mass", respectively, unless otherwise specified. Meanwhile, the weight-average molecular weight of the polymer, the average particle size and solid content of the pigment-containing polymer particles and the viscosity of the ink were respectively measured by the following methods.

(1) Measurement of Weight-Average Molecular Weight of Polymer

The weight-average molecular weight of the polymer was measured by gel permeation chromatography using N,N-dimethyl formamide containing 60 mmol/L of phosphoric acid and 50 mmol/L of lithium bromide as a solvent and using a polystyrene as a reference standard substance. The measurement was carried out using two columns "TSK-GEL, α-M" available from Tosoh Corporation; a GPC apparatus "HLC-8120GPC" available from Tosoh Corporation; and a flow velocity of 1 mL/min.

(2) Measurement of Average Particle Sizes of Pigment-Containing Polymer Particles The average particle size of the pigment-containing polymer particles was measured by using a laser particle analyzing system "ELS-8000" (cumulant analysis) available from Otsuka Electronics Co., Ltd. The measurement was conducted under the following conditions: temperature: 25° C.; angle between incident light and detector: 90°; cumulative frequencies: 100, and a refractive index of water (1.333) was input to the analyzing system as a refractive index of the dispersing medium. Further, the measurement was conducted by adjusting a concentration of the dispersion to be measured to $5 \times 10^{-3}$% by mass. The smaller the average particle size, the more excellent the dispersibility of the pigment-containing polymer particles becomes.

(3) Measurement of Solid Content

One gram of the water dispersion of the pigment-containing polymer particles and 10 g of sodium sulfate (mirabilite) were uniformly mixed with each other, and the resulting mixture was uniformly spread over a 10.5 cm² evaporating dish and dried under reduced pressure at 105° C. under a pressure of −0.07 MPa for 2 h. The mass of the thus dried product of the water dispersion was measured to determine a solid content (% by mass) thereof according to the following formula.

Solid Content (%)=[(mass of dried product of water dispersion)/(mass of water dispersion before dried)]×100

(4) Measurement of Viscosity:

The measurement of the viscosity was carried out at 20° C. and a rotating speed of 100 rpm for 1 min using an E-type viscometer "RE80" available from Toki Sangyo Co., Ltd., and a standard rotor (1° 34'×R24).

Production Example 1

Production of Polymer Solution

Fifty five parts of methyl ethyl ketone (MEK) and 0.08 part of a chain transfer agent (2-mercaptoethanol) as well as 10% of each of 15 parts of acrylic acid and 85 parts of benzyl acrylate as monomers were charged into a reaction vessel and mixed with each other, and then the reaction vessel was fully purged with a nitrogen gas to thereby obtain a monomer solution initially charged.

Separately, remaining 90% of each of the above reagents was charged into a dropping funnel, and then 1.0 part of a polymerization initiator (2,2'-azobis(2,4-dimethylvaleronitrile); tradename: "V-65") available from Wako Pure Chemical Industries, Ltd., was added thereto and mixed with each other, and the dropping funnel was fully purged with a nitrogen gas to thereby obtain a monomer solution for dropwise addition.

The monomer solution initially charged in the reaction vessel was heated to 60° C. while stirring in a nitrogen atmosphere, and then the monomer solution for dropwise addition in the dropping funnel was gradually added dropwise into the reaction vessel over 3 h. After completion of the dropwise addition, a solution prepared by dissolving 0.6 part of the polymerization initiator in 2.5 parts of methyl ethyl ketone was added to the resulting reaction solution, thereby obtaining a polymer solution.

The thus obtained polymer solution was dried under reduced pressure at 105° C. for 2 h to remove methyl ethyl ketone therefrom, thereby obtain a polymer. The weight-average molecular weight of the thus obtained polymer was 70,000.

Preparation Example 1

Preparation of Water Dispersion of Pigment-Containing Polymer Particles

Added into a solution prepared by dissolving 21.4 parts of the polymer obtained in Production Example 1 in 66.9 parts of methyl ethyl ketone were 6.3 parts of a 5N sodium hydroxide aqueous solution, 9.1 parts of a 25% ammonia aqueous solution and 212 parts of ion-exchanged water. The resulting mixture was stirred and then charged into a disperser "Ultra Disper" available from Asada Iron Works Co., Ltd., and treated therein using a disper blade at 1,400 rpm for 15 min. Thereafter, 50 parts of carbon black "Monarch 880" (tradename) available from Cabot Corp., as a pigment was added to the disperser, and the contents of the disperser were further treated therein at 8,000 rpm at 15° C. for 1 h. Next, the obtained dispersion was subjected to a high-pressure dispersing treatment using a high-pressure disperser "Microfluidizer M-140K" available from Microfluidics Corporation by passing therethrough 20 times under a pressure of 180 MPa.

Next, the dispersion obtained by the high-pressure dispersing treatment was heated to 60° C. under reduced pressure to distil off methyl ethyl ketone, the volatile base and a part of water therefrom, thereby obtaining a water dispersion of pigment-containing polymer particles. The resulting water dispersion had a pigment content of 14%, a mass ratio [pigment/polymer] of 2.3 and a viscosity of 4.1 mPa·s (as measured at 20° C.), and the pigment-containing polymer particles had an average particle size of 94.2 nm.

The resulting water dispersion of the polymer particles was free of odors derived from methyl ethyl ketone and ammonia.

Preparation Example 2

Production of Water-Based Ink

Seven parts of glycerol, 7 parts of trimethylol propane, 5 parts of triethylene glycol, 0.5 part of an ethyleneoxide adduct of acetylene glycol "ACETYLENOL E100" (tradename; acetylene glycol-based surfactant; average molar number of addition of ethyleneoxide: 10) available from Kawaken Fine Chemical Co., Ltd., and 73.4 parts of ion-exchanged water were mixed with each other, and the resulting mixture was stirred at room temperature for 15 min, thereby obtaining a mixed solution.

Next, while stirring 25 parts of the water dispersion of the pigment-containing polymer particles (7.1 parts in terms of a solid content of the dispersion; 5 parts in terms of the pigment) obtained in Preparation Example 1 using a magnetic stirrer, the mixed solution was added thereto, and the resulting dispersion was subjected to filtration through a 1.2 μm filter (acetyl cellulose membrane) available from Fujifilm Corporation, thereby obtaining a water-based ink. The resulting water-based ink had a pigment content of 5% and a mass ratio [pigment/polymer] of 2.3, and the pigment-containing polymer particles contained therein had an average particle size of 94.2 nm.

Examples 1 to 10 and Comparative Examples 1 to 7

In Example 1, the water-based ink produced through Production Example 1 and Preparation Examples 1 and 2 was used.

In Examples 2, 9 and 10 and Comparative Examples 1 to 7, the same procedures as in Production Example 1 and Preparation Examples 1 and 2 were repeated except that the monomers and monomer ratios were changed as shown in Table 1, thereby obtaining water-based inks.

In Examples 3 to 5, the same procedures as in Production Example 1 and Preparation Examples 1 and 2 were repeated except that the amount of the polymer used in Preparation Example 1 was varied such that the mass ratio [pigment/polymer] in water dispersion obtained in Preparation Example 1 was changed to such a mass ratio [pigment/polymer] as shown in Table 1, thereby obtaining water-based inks.

In Examples 6 and 7, the same procedures as in Production Example 1 and Preparation Examples 1 and 2 were repeated except that the amount of the polymerization initiator used in Production Example 1 was changed to produce a polymer having a weight-average molecular weight as shown in Table 1, thereby obtaining water-based inks.

In Example 8, the same procedures as in Production Example 1 and Preparation Examples 1 and 2 were repeated except that the pigment used in Preparation Example 1 was replaced with a cyan pigment "CFB6338JC" (tradename)

available from Dainichiseika Color & Chemicals Mfg. Co., Ltd., thereby obtaining a water-based ink.

The resulting water-based inks were subjected to observation and evaluation of kogation and calculation of an average ejection speed of ink droplets by the following methods. The results are shown in Table 1.

(1) Observation and Evaluation of Kogation

An in-house manufactured thermal ink-jet ejection observation apparatus equipped with an electronic force balance capable of adjusting an applied voltage, a pulse width and a drive frequency therein was used as an apparatus for evaluation of kogation, and an ink cartridge "HP135" available from Hewlett Packard Company (HP) which was filled with the respective inks obtained above was loaded thereinto. Using the apparatus, a solid image was printed on a commercially available plain paper "Xerox 4200" (a high-quality paper; 279.4 mm in length×215.9 mm in width) available from Xerox Corporation by continuously ejecting ink droplets in $1 \times 10^7$ passes.

Nozzle diameter of print head: about 20 μm;
Applied voltage: 16.5 V; Pulse width: 1 μs; Drive frequency; 5 kHz;
Amount of ink droplets ejected: about 4 pL/droplet;
Ejection speed of ink droplets: 12 m/s.

After printing the solid image, the print head was disassembled, and a heater portion of the print head was gently washed with pure water and then observed using an optical microscope to evaluate occurrence of kogation according to the following ratings.

(Ratings for Evaluation of Kogation)
A: No deposits were recognized.
B: Deposits were recognized over 30% or less of a surface area of a resistive element of the heater.
C: Deposits were recognized over more than 30% of a surface area of a resistive element of the heater.

(2) Calculation of Average Ejection Speed of Ink Droplets

Using an in-house manufactured thermal ink-jet ejection observation apparatus as an evaluation apparatus, the ink was ejected under the same conditions as used in the above "Observation and Evaluation of Kogation" to measure an elapsed time required until an ink droplet ejected from a nozzle reached a position spaced apart by a distance of 0.5 mm from the nozzle and an elapsed time required until an ink droplet ejected from a nozzle reached a position spaced apart by a distance of 1.5 mm from the nozzle using a strobe and a camera. The average ejection speed of the ink droplets was calculated by dividing 1.0 mm (=1.5 mm−0.5 mm) by the difference between the elapsed times.

TABLE 1

| | Examples | | | | | | | |
|---|---|---|---|---|---|---|---|---|
| | 1 | 2 | 3 | 4 | 5 | 6 | 7 | 8 |
| Kind of monomer (solid content; part(s) by mass) | | | | | | | | |
| Acrylic acid | 15 | 20 | 15 | 15 | 15 | 15 | 15 | 15 |
| Methacrylic acid | — | — | — | — | — | — | — | — |
| Benzyl acrylate | 85 | 80 | 85 | 85 | 85 | 85 | 85 | 85 |
| Butyl acrylate | — | — | — | — | — | — | — | — |
| Benzyl methacrylate | — | — | — | — | — | — | — | — |
| Weight-average molecular weight of polymer | 70,000 | 86,000 | 70,000 | 70,000 | 70,000 | 26,000 | 100,500 | 70,000 |
| Content of pigment (%) | 5 | 5 | 5 | 5 | 5 | 5 | 5 | 5 |
| Kind of pigment[*1] | CB | CB | CB | CB | CB | CB | CB | CY |
| —COOH (mmol)/pigment (g) | 0.906 | 1.208 | 1.389 | 1.122 | 0.694 | 0.906 | 0.906 | 0.906 |
| Mass ratio [pigment/polymer] | 2.3 | 2.3 | 1.5 | 1.9 | 3.0 | 2.3 | 2.3 | 2.3 |
| Average particle size of polymer particles (nm)[*2] | 94.2 | 99.3 | 96.3 | 93.7 | 95.5 | 95.2 | 93.2 | 94.5 |
| Kogation | A | A | A | A | A | A | A | A |
| Ejection speed (m/s) | 12 | 13 | 10 | 13 | 10 | 11 | 11 | 12 |

| | Comparative Examples | | | | | | Examples | | Com. |
|---|---|---|---|---|---|---|---|---|---|
| | 1 | 2 | 3 | 4 | 5 | 6 | 9 | 10 | Ex. 7 |
| Kind of monomer (solid content; part(s) by mass) | | | | | | | | | |
| Acrylic acid | 10 | 25 | 30 | 15 | — | — | 15 | 20 | 10 |
| Methacrylic acid | — | — | — | — | 15 | 15 | — | — | — |
| Benzyl acrylate | 90 | 75 | 70 | — | 85 | — | — | — | — |
| Butyl acrylate | — | — | — | — | — | — | 85 | 80 | 90 |
| Benzyl methacrylate | — | — | — | 85 | — | 85 | — | — | — |
| Weight-average molecular weight of polymer | 91,000 | 130,000 | 89,000 | 52,000 | 64,000 | 72,000 | 51,000 | 65,000 | 70,000 |
| Content of pigment (%) | 5 | 5 | 5 | 5 | 5 | 5 | 5 | 5 | 5 |
| Kind of pigment[*1] | CB | CB | CB | CB | CB | CB | CB | CB | CB |
| —COOH (mmol)/pigment (g) | 0.604 | 1.510 | 1.812 | 0.906 | 0.758 | 0.758 | 0.906 | 1,208 | 0.604 |
| Mass ratio [pigment/polymer] | 2.3 | 2.3 | 2.3 | 2.3 | 2.3 | 2.3 | 2.3 | 2.3 | 2.3 |
| Average particle size of polymer particles (nm)[*2] | 92.3 | 152.5 | 190.6 | 230.5 | 95.6 | 98.8 | 95.6 | 99.8 | 92.5 |

TABLE 1-continued

| Kogation | C | B | B | C | C | C | A | A | C |
|---|---|---|---|---|---|---|---|---|---|
| Ejection speed (m/s) | 3 | 7 | 7 | 3 | 3 | 3 | 10 | 11 | 3 |

Note
*[1]CB: carbon black; CY: cyan pigment
*[2]Average particle size of pigment-containing polymer particles From the results shown in Table 1, it was confirmed that the water-based inks obtained in Examples 1 to 10 were excellent in dispersibility, effect of suppressing occurrence of kogation and ejection speed of ink droplets as compared to the water-based inks obtained in Comparative Examples 1 to 7.

INDUSTRIAL APPLICABILITY

In the thermal ink-jet printing method according to the present invention, it is possible to fully suppress occurrence of kogation, and therefore the thermal ink-jet printing method can be suitably used as an ink-jet printing method in extensive applications.

The invention claimed is:

1. An ink-jet printing method comprising the step of ejecting a water-based ink comprising pigment-containing polymer particles from a print head, in which the polymer constituting the polymer particles comprises not less than 78% by mass and not more than 88% by mass of a constitutional unit derived from an acrylic acid ester comprising a hydrocarbon group having not less than 3 and not more than 8 carbon atoms, and not more than 22% by mass and not less than 12% by mass of a constitutional unit derived from acrylic acid, on the basis of a total mass of whole constitutional units in the polymer constituting the polymer particles, the method of ejecting the ink is a thermal method comprising the step of ejecting a water-based ink from a print head by an action of a thermal energy.

2. The ink-jet printing method according to claim 1, wherein the hydrocarbon group of the acrylic acid ester comprising the hydrocarbon group is at least one group selected from the group consisting of an alkyl group having not less than 4 and not more than 6 carbon atoms and an aromatic group having not less than 6 and not more than 7 carbon atoms.

3. The ink-jet printing method according to claim 1, wherein
the acrylic acid ester comprising the hydrocarbon group is at least one compound selected from the group consisting of butyl acrylate and benzyl acrylate.

4. The ink-jet printing method according to claim 1, wherein the polymer has a weight-average molecular weight of not less than 5,000 and not more than 400,000.

5. The ink-jet printing method according to claim 1, wherein the pigment-containing polymer particles have an average particle size of not less than 50 nm and not more than 200 nm.

6. The ink-jet printing method according to claim 1, wherein an average ejection speed of droplets of the ink is not less than 6 m/s and not more than 20 m/s.

7. The ink-jet printing method according to claim 1, wherein an amount of the ink ejected is controlled such that an amount of one droplet of the ink ejected is not less than 0.5 pL and not more than 30 pL.

8. The ink-jet printing method according to claim 1, wherein a mass ratio of the pigment to the polymer [pigment/polymer] in the water-based ink is not less than 1.0 and not more than 9.0.

9. The ink-jet printing method according to claim 1, wherein a content of the constitutional unit derived from the acrylic acid ester in the polymer is not less than 80% by mass and not more than 86% by mass, and a content of the constitutional unit derived from acrylic acid in the polymer is not more than 20% by mass and not less than 14% by mass.

10. The ink-jet printing method according to claim 1, wherein a content of the pigment in the water-based ink is not less than 1% by mass and not more than 25% by mass.

11. The ink-jet printing method according to claim 1, wherein a mass ratio of the pigment to the polymer [pigment/polymer] in the water-based ink is not less than 1.5 and not more than 6.0.

12. The ink-jet printing method according to claim 1, wherein a ratio of a molar amount of a carboxy group of the polymer to a mass of the pigment [—COOH (mmol)/pigment (g)] in the water-based ink is not less than 0.65 mmol/g and not more than 1.40 mmol/g.

13. The ink-jet printing method according to claim 1, wherein a content of water in the water-based ink is not less than 30% by mass and not more than 90% by mass.

14. The ink-jet printing method according to claim 1, wherein a total content of the constitutional unit derived from the acrylic acid ester and the constitutional unit derived from acrylic acid in the polymer is not less than 95% by mass.

15. The ink-jet printing method according to claim 1, wherein a total content of the constitutional unit derived from the acrylic acid ester and the constitutional unit derived from acrylic acid in the polymer is not less than 98% by mass.

16. The ink-jet printing method according to claim 1, wherein a process for producing the water-based ink is carried out by such a production process including the following steps (I) to (IV):
   Step (I): obtaining a mixture containing a polymer, an organic solvent, a pigment and water;
   Step (II): subjecting the mixture obtained in the step (I) to dispersing treatment to obtain a dispersion of pigment-containing polymer particles;
   Step (III): removing the organic solvent from the dispersion obtained in the step (II) to obtain a water dispersion of the pigment-containing polymer particles; and
   Step (IV): obtaining a water-based ink by using the water dispersion of the pigment-containing polymer particles obtained in the step (III).

17. The ink-jet printing method according to claim 1, wherein a viscosity of the water-based ink (as measured at 20° C.) is not less than 2.0 mPa·s and not more than 12 mPa·s.

18. The ink-jet printing method according to claim 1, wherein a drive frequency used for the heater is not less than 0.1 kHz and not more than 20 kHz.

19. The ink-jet printing method according to claim 1, wherein a pulse width used for the heater is not less than 0.01 µs and not more than 3.0 µs.

20. The ink-jet printing method according to claim 1, wherein a weight-average molecular weight of the polymer is not less than 20,000 and not more than 200,000.

* * * * *